United States Patent
Kanzaki et al.

(10) Patent No.: US 7,650,564 B2
(45) Date of Patent: Jan. 19, 2010

(54) GLOBAL TONE ADJUSTMENT SYSTEM FOR DOCUMENT FILES CONTAINING TEXT, RASTER, AND VECTOR IMAGES

(75) Inventors: Eisuke Kanzaki, Fujisawa (JP); Takumi Kobayashi, Yamato (JP); Shigeo Azuma, Yokohama (JP); Yasuko Katoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 11/247,364

(22) Filed: Oct. 11, 2005

(65) Prior Publication Data
US 2006/0077494 A1  Apr. 13, 2006

(30) Foreign Application Priority Data
Oct. 15, 2004  (JP)  ............... 2004-302138

(51) Int. Cl.
*G06F 17/00* (2006.01)
*H04N 1/46* (2006.01)

(52) U.S. Cl. .................. 715/205; 715/234; 715/235; 715/255; 358/537

(58) Field of Classification Search .......... 715/200, 715/201, 205, 234, 255, 760, 204, 226, 231, 715/235, 243, 249, 256, 273, 744, 746, 747; 345/24, 25, 418, 428, 520, 522, 530, 581, 345/603–605, 619, 625, 650, 661; 707/1, 707/104, 200
See application file for complete search history.

(56) References Cited

U.S. PATENT DOCUMENTS 6,986,107 B2 *  1/2006  Hanggie et al. ............. 715/815
6,999,101 B1 *  2/2006  Sanborn et al. ............. 345/619

(Continued)

FOREIGN PATENT DOCUMENTS

JP  6012408  1/1994

(Continued)

OTHER PUBLICATIONS

"Cascading Style Sheets, Level 1", W3C Recommendation, Dec. 17, 1996, revised Jan. 11, 1999, pp. 1-70.*

(Continued)

*Primary Examiner*—Laurie Ries
*Assistant Examiner*—MaiKhanh Nguyen
(74) *Attorney, Agent, or Firm*—Andre Gibbs; Shimokaji & Associates, P.C.

(57) ABSTRACT

A document editing system supports globally editing the tone of an entire Web page without individually working on a plurality of factors characterizing the general effect (tone) of a document file such as a Web page. Upon receipt of an input of an effect (tone) from a user, parameterization occurs for a style tone of a style of a document file, a vector tone of a vector image included in the document file and a raster tone of a raster image included in the document file. A style adjuster then adjusts the style tone, the vector tone and the raster tone in response to the tone input from the user, and a display device displays the document file including the adjusted vector image and the raster image and modified according to the adjusted style.

5 Claims, 11 Drawing Sheets

U.S. PATENT DOCUMENTS

| | | | |
|---|---|---|---|
| 7,017,117 B2* | 3/2006 | Capps | 715/767 |
| 7,028,262 B2* | 4/2006 | Estrada et al. | 715/751 |
| 7,145,692 B2* | 12/2006 | Simpson et al. | 358/1.9 |
| 7,383,498 B1* | 6/2008 | Hickl et al. | 715/235 |
| 2001/0020956 A1* | 9/2001 | Moir | 345/765 |
| 2002/0046245 A1* | 4/2002 | Hillar et al. | 709/205 |
| 2003/0086104 A1* | 5/2003 | Chen | 358/1.9 |
| 2005/0041040 A1* | 2/2005 | Fukuda et al. | 345/619 |

FOREIGN PATENT DOCUMENTS

| | | |
|---|---|---|
| JP | 6195332 | 7/1994 |
| JP | 7306935 | 11/1995 |
| JP | 9006573 | 1/1997 |
| JP | 9016797 | 1/1997 |
| JP | 2004013457 | 1/2004 |

OTHER PUBLICATIONS

Fraternali et al., "Model-Driven Development of Web Applications: The Autoweb System", ACM, Transaction on Information Systems (TOIS), vol. 18, Issue 4, Oct. 2000, pp. 323-382.*

Copeland et al., "Which Web Development Tool Is Right for You?", IEEE, Mar.-Apr. 2000, pp. 20-27.*

Chuang et al., "A Visual Authoring System for Animated Multilanguage Homepage", IEEE, Oct. 2000, pp. 249-254.*

Aozora Study Group, PowerPoint 2002 Perfect Master, Japan, Shuwa System Co., Ltd., Oct. 1, 2001, First Version, p. 44-45, p. 135-136, p. 139-145, p. 221-231.

Rubin Charles, Microsoft Office Word 2003 Official Manual, Japan, Nikkei BP Soft Press, Inc., Jul. 12, 2004, First Version.

* cited by examiner

GLOBAL TONE ADJUSTMENT SYSTEM FOR DOCUMENT FILES CONTAINING TEXT, RASTER, AND VECTOR IMAGES

FIELD OF THE INVENTION

The present invention relates generally to a document editing system.

BACKGROUND OF THE INVENTION

Creation and disclosure of personal home pages has become common with the spread of Internet technologies in recent years. On the other hand, most computer users create files, documents, and reports by means of presentation software or the like without a connection to a public network such as the Internet and use document files created in the home or in the office.

In general, a Web page or a document file (hereinafter, referred to as "document file") is often composed of several types of files. For example, a Web page including a photograph as a document file is composed of three types of files: a file of the Web page, an image file of the photograph taken by a digital camera or the like and an image file of special effect characters for use in explaining the foregoing image file.

Software products for creating a Web page or a document file (hereinafter referred to as "document file") are widely available. For designing an entire document file, however, the software often requires a creator to have a certain expertise.

For example, factors in determining the general effect (hereinafter, referred to as "tone" from time to time) in the design of a document file are "the entire or partial layout of the document file," "color tones of the entire or individual contents of the document file," "a display method of links (index of related files that can be displayed)," "types of fonts (including graphically represented character types in addition to document fonts)" or the like. In general, a user adjusts at least one of these four factors to modify the design.

To adjust these factors, however, the user needs expertise in a plurality of areas since the adjustment requires a knowledge of how to use software used for individual factors or of how to edit the document file (in the case of a Web page, tag specifications in Hyper document Markup Language (HTML) or the like).

Granted that the user knows how to adjust the individual factors, he or she has to make individual works for the respective factors to adjust the document file. Therefore, after a fine adjustment for one factor, the user need to make an adjustment suitable for the fine adjustment for another factor and further an adjustment with consideration of the total harmonious balance.

For example, to change a color tone of an entire Web page, the user needs to find a location where the color tone of the entire Web page is specified from an HTML tag and to specify an appropriate color tone at an appropriate location on the assumption that the specification of the color tone generates an ideal color tone the user wants.

Moreover, to change the color tone of an image used in a part of the Web page (for example, a raster image referred to as a bitmap image), the user has to be able to use dedicated software for changing the color tone of the image. Thus, the software requires the user to have a specialized knowledge in independent and individual areas to adjust some of the above four factors.

Furthermore, these adjustments are made individually for each factor, and therefore it is impossible to adjust all of the factors simultaneously. Specifically, if a user changes the color tone of an image in a part of the Web page to a brighter one and further changes the color tone of the entire Web to a brighter color tone suitable for the foregoing, the degree of the former adjustment in brightness often finely differs from the degree of the latter adjustment in brightness, and therefore the user needs to make adjustments of both repeatedly.

As a conventional method of changing a general effect of a Web page without expertise, there is already known a method of changing a Web page by using a design template previously created by a designer or the like. Software for creating a Web page is provided with styles, which determine the general effect (soft, simple, natural, and the like and their subordinate concepts), so that a user selects one of the general effects for the Web page by means of the styles.

While a user can create a Web page by selecting a template suitable for the general effect of the entire Web page out of the prepared templates, the template approach cannot be used where the entire Web page has already been created. Specifically, it is impossible to adjust the general effect (color tone, font, or the like) once the layout has been completed with the contents constituting parts of the Web page (images or fonts arranged in the Web page or the like) arranged. Furthermore, it is impossible to change the effects of the contents constituting the parts of the Web page simultaneously with the adjustment of the general effect of the Web page.

Generally, a user sometimes wants to change the general effect (tone) of a document file created on a trial basis (or a document file created once). Specifically, the user sometimes wants to finely adjust the general tone of the document file (wants to make the color tone brighter or to change the document file into "Japanese style") using the same contents.

For these fine adjustments, the user similarly needs to make fine adjustments of the contents constituting the parts of the document file (images or fonts arranged in the document file) in addition to the adjustments of the file that is a base of the document file as stated above.

To resolve this problem, there is a known method of storing the entire document file as an image (a raster image referred to as a bitmap image) and adjusting, for example, a color tone or contrast by means of image processing software. In using this method, however, the file processed by means of the image processing software can be quite large, slowing up the image processing operations. Moreover, a file created in this manner is an image file and thus cannot be edited as a text file.

It is an object of the present invention to provide a document editing method, a program for executing the document editing method, and a document editing system, each of which enables creating a harmonious document file at a time and easily without individually working on a plurality of factors characterizing the general effect (tone) of a document file.

SUMMARY OF THE INVENTION

The invention is implemented as a computer system for adjusting a general effect of a document file including a raster image and a vector image. The system includes a tone input device for receiving a tone input from a user, a parameter converter for parameterizing a style tone of a style of the document file, a vector tone of the vector image included in the document file, and a raster tone of the raster image included in the document file, a style adjuster for adjusting the style of the document file by adjusting the parameterized style tone in response to the tone input from the user, a vector image adjuster for adjusting the vector image included in the document file by adjusting the parameterized vector tone in response to the tone input from the user, a raster image adjuster for adjusting the raster image included in the document file by adjusting the parameterized raster tone in response to the tone input from the user and a display device for displaying the document file including the adjusted vector image and raster image and modified according to the adjusted style.

According to the present invention, the tone input device receives the tone input from the user and the parameter converter parameterizes the style tone of the style of the document file, the vector tone of the vector image included in the document file and the raster tone of the raster image included in the document file. Moreover, in response to the tone input from the user, the style adjuster adjusts the style tone parameterized by the parameter converter, the vector image adjuster adjusts the parameterized vector tone, the raster image adjuster adjusts the parameterized raster tone. The display device displays the document file including the adjusted vector image and raster image and modified according to the adjusted style.

According to the present invention, it is possible to adjust "style" of the entire document that is a factor characterizing the general effect (tone) of the entire document file, and a vector image and a raster image used as "image contents" of the document file so as to be suitable for the general effect intended by a user. The general effect can be changed at a time, without making individual adjustments for the respective factors (style, images used as contents) as has been done by conventional technology.

Furthermore, according to the present invention, the general effect can be changed for the entire previously-created document file. Specifically, it is possible to adjust the general effect (color tone, font, and the like) when the layout is completed with the contents (images, fonts, and the like arranged in a Web page or the like) constituting the parts of the document file arranged. Furthermore, it is possible to adjust the effects of the contents constituting the parts of the document file concurrently with the adjustment of the general effect of the entire document file.

In addition, the present invention does not require processing of a file of a large file size by means of image processing software, since it does not adopt a method of storing an entire document file as an image (a raster image referred to as a bitmap image) and adjusting, for example, a color tone or contrast by using the image processing software to adjust the general effect of the entire document file.

Furthermore, specifically, a user inputs a tone by selecting a theme. Then, the style adjuster, the vector image converter, and the raster image adjuster adjust the document file and the display device displays the adjusted document file. Thereafter, the tone input device further receives a tone input from the user and the parameter converter parameterizes a style tone of a style of the document file, a vector tone of the vector image included in the document file, and a raster tone of the raster image included in the document file. The style adjuster then adjusts the style tone parameterized by the parameter converter in response to the tone input from the user, the vector image adjuster adjusts the parameterized vector tone, the raster image adjuster adjusts the parameterized raster tone, and the display device displays the document file including the adjusted vector image and raster image and modified according to the adjusted style.

Therefore, if the user wants to change the general effect of the document file, he or she selects a theme similar to the effect expected by the user and makes fine adjustments of the tone on the basis of the document file adjusted according to the theme. Accordingly, the user can select the theme representing the general effect expected by the user first, and then adjust the document file in stages for fine adjustments. Therefore, the user can adjust the general effect of the document file easily and rapidly. Moreover, the user can select a theme and further make adjustments, unlike the conventional document file adjustment only with the flexibility to select a template (a preset tone). Consequently, the user can create a Web site rich in originality.

Therefore, according to the present invention, it is possible to adjust "style" of the entire document that is a factor characterizing the general effect (tone) of the entire document file, a vector image and a raster image used as "image contents" of the document file so as to be suitable for the general effect intended by a user. In other words, the general effect can be changed at a time, without making individual adjustments for the respective factors (style, images used as contents) as has been done by conventional technology.

Furthermore, according to the present invention, the general effect can be changed with the entire document file created. Specifically, it is possible to adjust the general effect (color tone, font, and the like) when the layout is completed with the contents (images, fonts, and the like arranged in a Web page or the like) constituting the parts of the document file arranged. Furthermore, it is possible to adjust the effects of the contents constituting the parts of the document file concurrently with the adjustment of the general effect of the entire document file.

Note that the present invention enables adjustments of voice and music or motion (video) images as well as static images as objects of modification of the general effect of the Web page, in addition to the tone modifications of images such as the aforementioned vector image and raster image.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

The preferred embodiments of the present invention will now be described in detail hereinafter with reference to the accompanying drawings.

Figure 1:
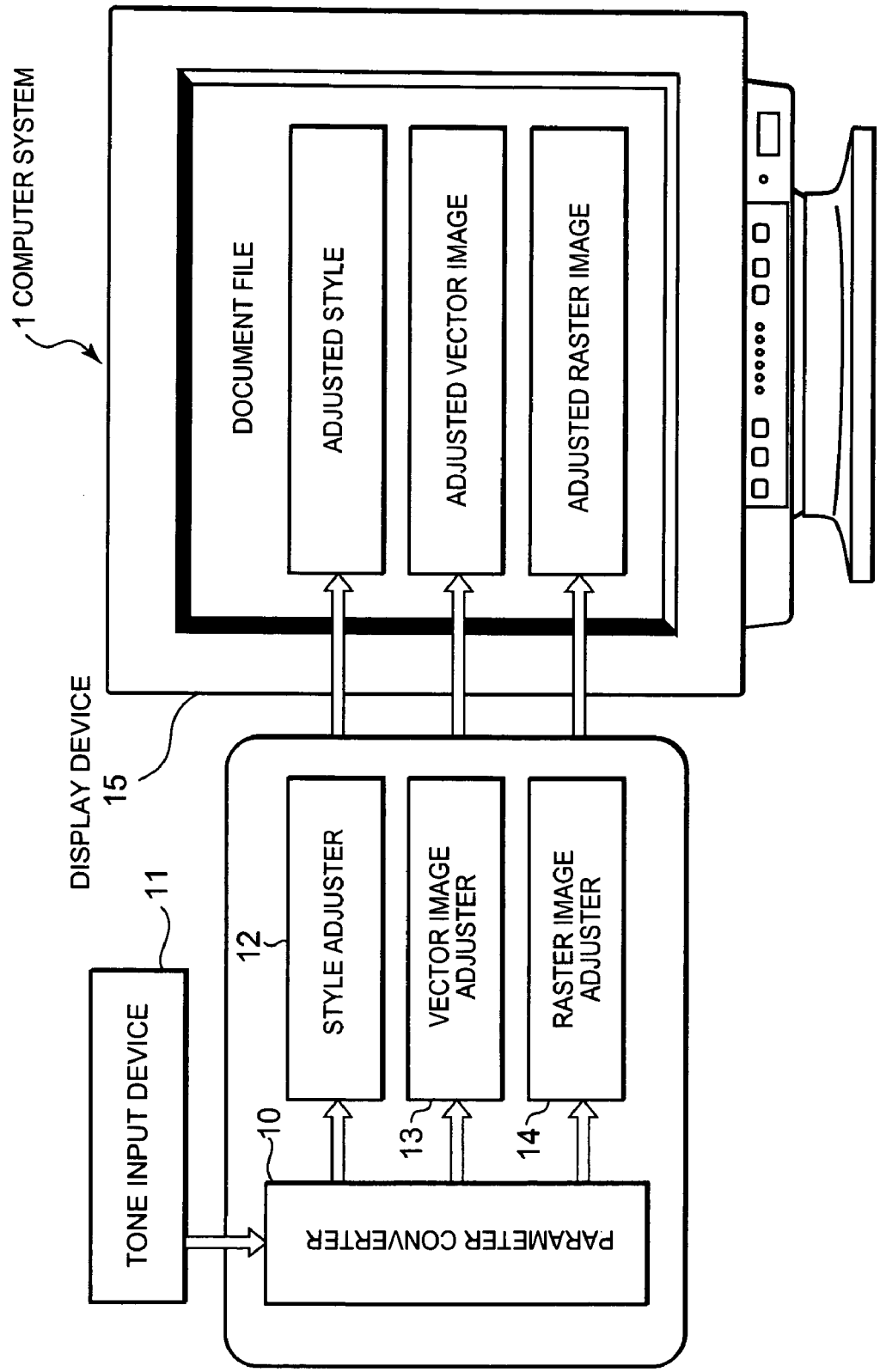
FIG. 1 is a diagram showing a hardware configuration of a computer system in which the invention can be implemented.

As shown in FIG. 1, a computer system 1 includes a tone input device 11 for receiving a tone input from a user, a parameter converter 10 for parameterizing a document file, a style adjuster 12 for adjusting the document file, a vector image adjuster 13, a raster image adjuster 14 and a display device 15 for displaying the document file.

The tone input device 11 is for use in receiving the tone input from the user. The tone input device 11 is, for example, a keyboard, a mouse, or another input device, which is means for a tone adjustment according to a parameter adjustment or a selection of a theme performed by the user.

The parameter converter 10 is for parameterizing the document file on the basis of a tone. The parameter converter 10 is means for parameterizing a style tone of a style of the document file, a vector tone of a vector image included in the document file, and a raster tone of a raster image included in the document file.

The style adjuster 12 is for adjusting a style tone. The style adjuster 12 is means for adjusting a style of the document file (for example, a layout of the entire document file, a font type, a font size, a margin size, background color tone, or the like) in response to a tone input from the user. For this adjustment, a style tone parameterized for the tone of the style is used as an adjustment indicator.

The vector image adjuster 13 is for adjusting a vector image. The vector image adjuster 13 is means for adjusting a vector image (an image with a graphics image composed of geometrical graphics primitives such as a straight line and a circle) in the document file in response to a tone input from the user. For this adjustment, a vector tone parameterized for the tone of the vector image is used as an adjustment indicator.

The raster image adjuster 14 is for adjusting a raster image. The raster image adjuster 14 is means for adjusting a raster image (an image with a graphics image composed of rows of dots) in the document file in response to a tone input from the user. For this adjustment, a raster tone parameterized for the tone of the raster image is used as an adjustment indicator.

The display device 15 is a CRT display, an LCD display, or another display. The display device 15 displays styles and images adjusted by the style adjuster 12, the vector image adjuster 13, and the raster image adjuster 14. The user visually checks the document file displayed on the screen of the display device 15 and reviews what effect the Web page provides, whether the Web page is created as has been expected by the adjustment, and does input to the tone input device 11, if necessary.

Figure 2:
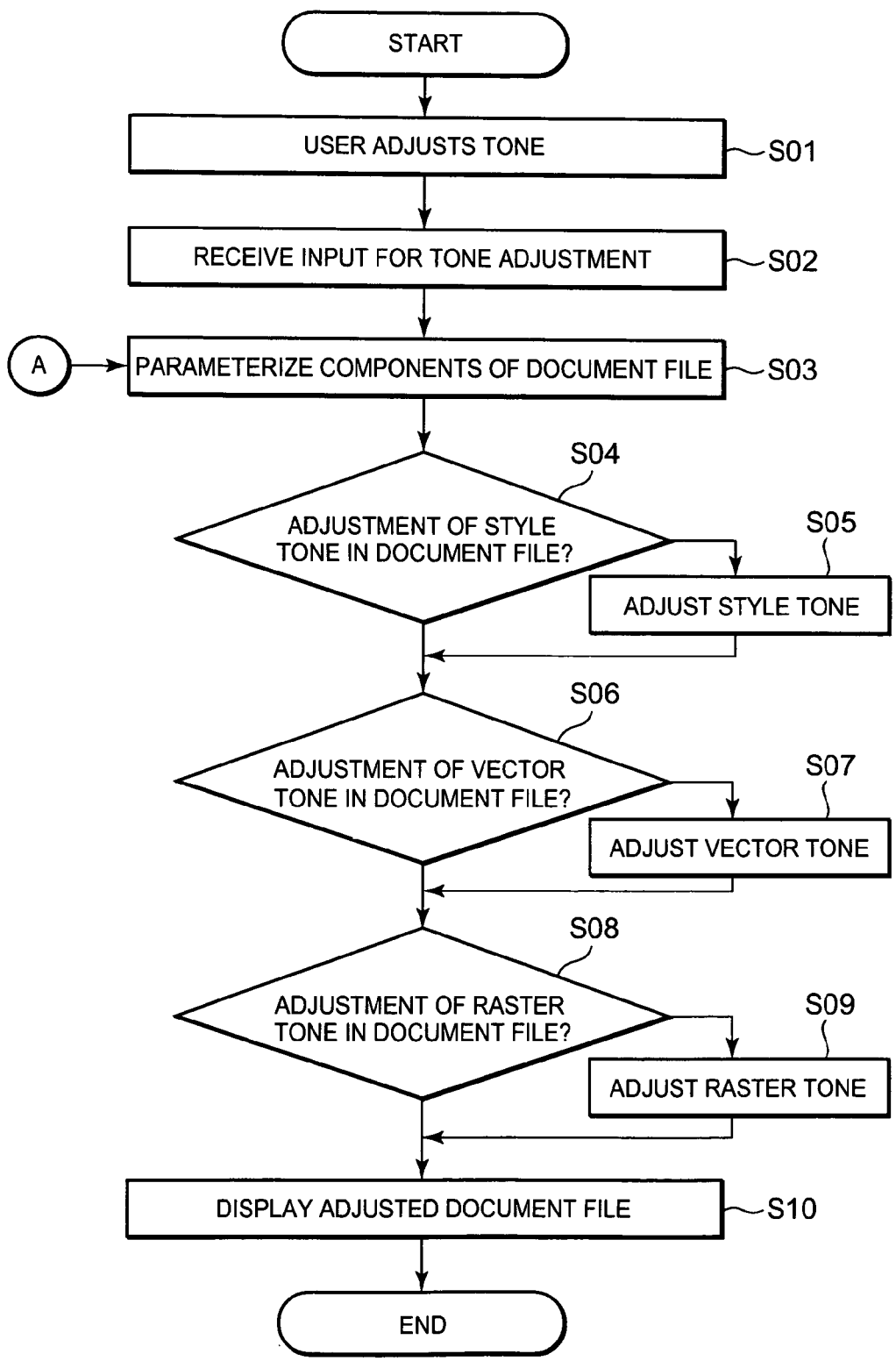
FIG. 2 is a flowchart showing an operation executed by the computer system according to an embodiment of the present invention.

Subsequently, the operation executed by the computer system 1 is described by using a flowchart shown in FIG. 2.

In response to a user's tone adjustment (S01), the tone input device 11 receives an input for a tone adjustment (S02). Subsequently, the parameter converter 10 parameterizes components of a document file on the basis of the tone (S03). The computer system 1 determines whether the input tone adjustment is for a style tone (S04). If so, it adjusts the style tone of a style of the document file (S05). The computer system 1 determines whether the input tone adjustment is for a vector tone (S06). If so, it adjusts the vector tone of a vector image (S07). The computer system 1 determines whether the input tone adjustment is for a raster tone (S08). If so, it adjusts the raster tone of a raster image (S09). The display device 15 displays the document file adjusted in this manner (S10).

If the user adjusts a tone again after the completion of step S10, the steps S02 to S10 are repeated.

Next, more specific steps to step S03 will be described.

Figure 3:
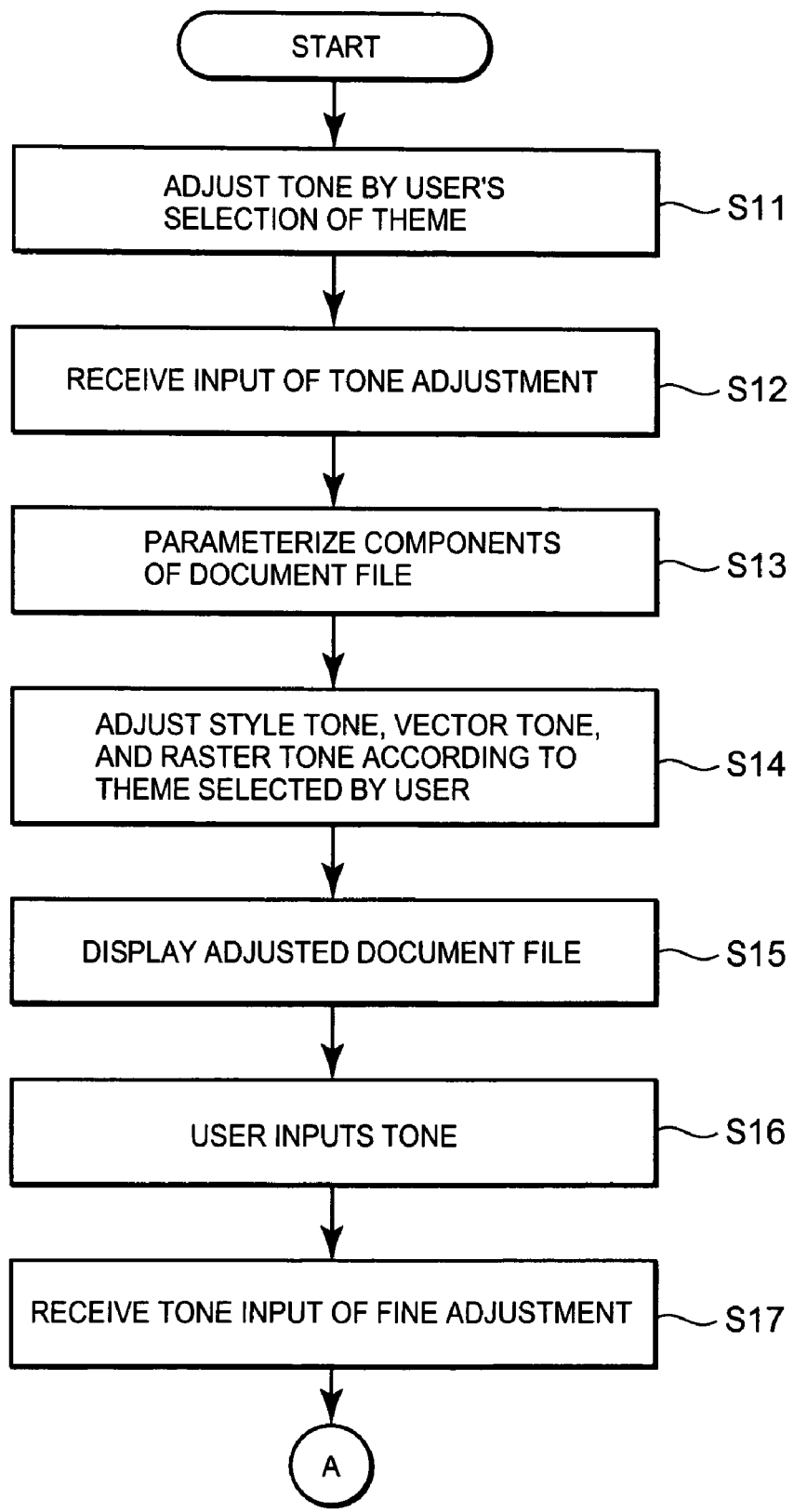
FIG. 3 is a flowchart of an operation executed by the computer system according to the embodiment of the present invention.

The tone input device 11 adjusts a tone by a user's selection of a theme (S11). The input device 11 receives an input of a tone adjustment (S12). Subsequently, the parameter converter 10 parameterizes the components of the document file (S13). According to the selection of the theme in step S11, the style adjuster 12 adjusts the parameterized style tone, the vector image adjuster 13 adjusts the parameterized vector tone, and the raster image adjuster 14 adjusts the parameterized raster tone (S14). The display device 15 displays the adjusted document file (S15). If there is still a need for adjustment of the general effect after the user's selection of the theme, the user does tone input again (S16). The tone input device 11 receives the tone input of fine adjustment (S17). To proceed with the subsequent adjustments, "A" in FIG. 3 is connected to "A" in FIG. 2, and step S03 and subsequent steps are executed.

The aforementioned steps may include the following steps. For example, the style tone, vector tone, and raster tone adjustment step may include a step of removing factors inhibiting the adjustments or a step of reflecting a parameter to be adjusted in an actual document file.

"Parameterization" is to evaluate the tone (effect) of the document file numerically. For example, a color tone can be numerically evaluated by means of an RGB (red-green-blue) value (a mixture proportion of the three primary colors) and it is referred to as "parameterizing a tone of color." In addition, "parameterized tone" means a numerically evaluated tone. Even for a tone other than the tone of color, it is referred to as "parameterizing tones" to numerically evaluate a degree of brightness indicating brightness of the entire document file, a font size or font type for use in the document file, a margin size of the document file and so forth.

In this regard, it is assumed that the tone includes an abstract concept such as, for example, "a warm tone" or "a cool tone." Even for these tones, the effect can be adjusted by converting a color tone, a font or the like.

The user's tone adjustment will be described by using FIG. 4. Here described is an embodiment in which the user adjusts the tone by selecting a theme out of a plurality of themes. The display device 15 displays an auto-stylish designer-setting screen shown in FIG. 4. At this point, it is possible to adjust the general effect by changing the theme and layout of a document file 47. By means of a preview, the user can visually check the document file 47 whose theme or the like has been changed.

The document file 47 is composed of a vector image 45, a raster image 43, and ordinary text characters. In addition, the layout of the contents and the color tone of a background and a link menu 44 characterize the general effect of the document file as a style.

The vector image 45 includes special effect characters formed by straight lines, dots, circles or other geometrical graphics primitives. It is a drawing image based on characters in a font, "Welcome to My Homepage."

A vector tone is a part related to the aforementioned vector image in the tone of the entire document file. For example, the vector tone is a tone of a color, brightness, a font type of special effect characters for the vector image or the like.

The raster image 43 is represented by a set of dots, corresponding to the dog image here. For example, the raster image referred to as "a bitmap image" can be a photograph image taken by a digital camera.

The raster tone is a part related to the aforementioned raster image in the tone of the entire document file. For example, the raster tone is a tone of a color, brightness for the raster image or the like.

In the document file 47, the style includes a color tone or pattern of the entire background, a color tone, pattern, size, or link indication type (for example, underlining item 1) of the link menu 44, a color tone, pattern, or size of a header 40 and a footer 47, a type, size or color tone of text characters for use, a total layout and a margin between contents (the raster image, the vector image and the text characters), for example.

The style tone is a part related to the aforementioned style in the tone of the entire document file. For example, the style tone is a tone of a color, brightness for the background of the document file or the like.

The style is set by changing an HTML tag setting or changing a cascading style sheet (hereinafter, referred to as "style sheet"). For example, a layout is changed by modifying a table arrangement in an HTML tag setting. The style sheet may be either included in an HTML file or managed separately from the HTML file by a style sheet file.

The theme represents a tone group for producing the general effect of a document file as a set of predetermined tones of colors, patterns, special effect characters or the like, which have been previously selected. For example, as shown in FIG. 4, representations of a theme such as "clear," "romantic," "casual," "elegant," "modern," "classic," "gorgeous," and "Japanese style" are stored as templates.

More detailed themes may have been set for the individual themes. For the selected theme "gorgeous" in FIG. 4, the detailed themes are "the Silk Road" producing an effect gorgeous and suggestive of the Silk Road, "Oriental" producing a gorgeous and oriental effect and "Art Nouveau" producing an effect gorgeous and suggestive of Art Nouveau.

Figure 4:
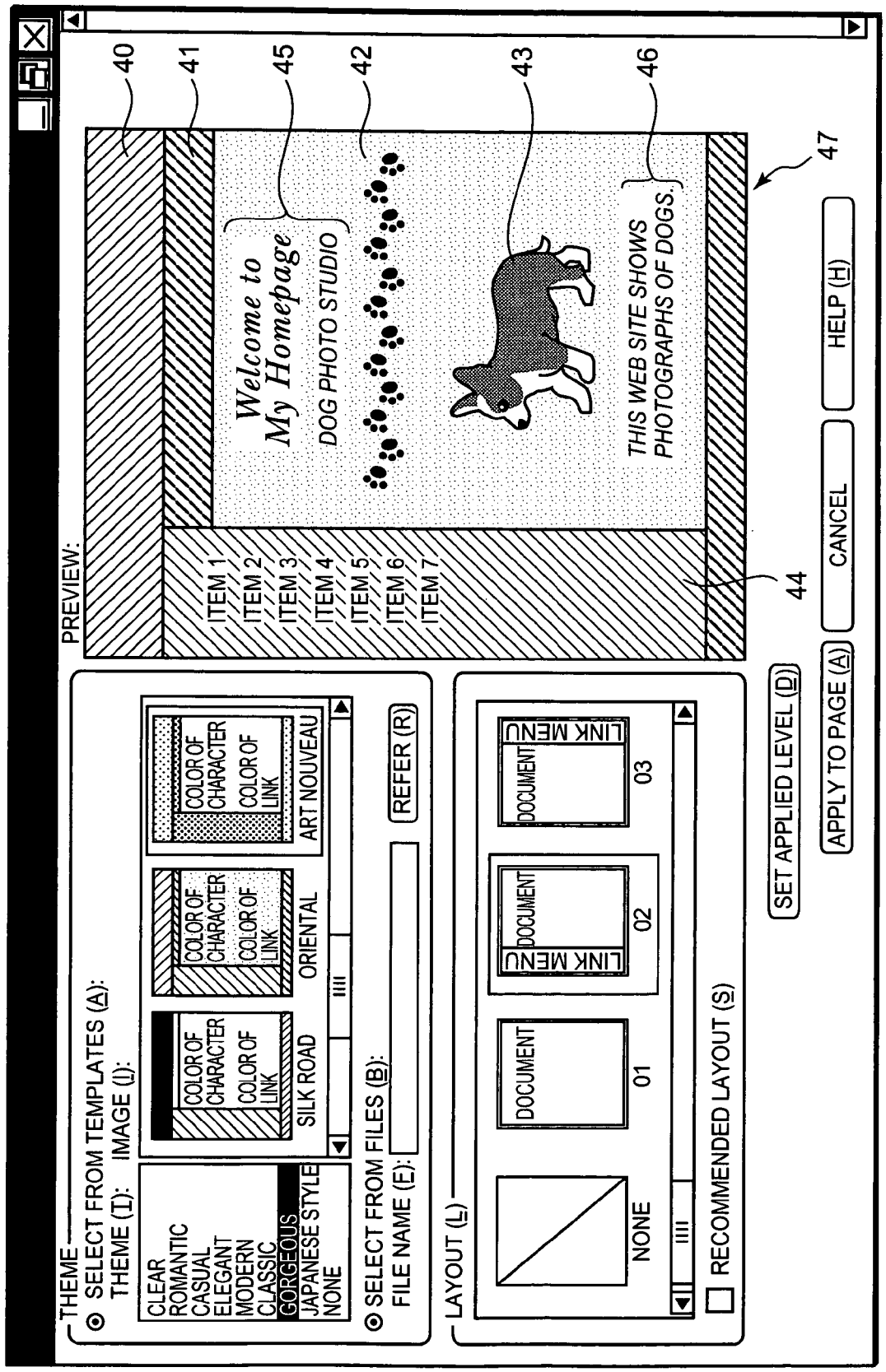
FIG. 4 is a diagram showing a screen displayed by a display device for making a tone adjustment by selecting a theme according to the embodiment of the present invention.

In FIG. 4, there is shown a preview for a selection of the theme "Art Nouveau" under "gorgeous." The theme "Art Nouveau" given as an example is based on a Mucha's painting and therefore the total color tone is based on brown and the selected font is slightly delicate and noble.

In FIG. 4, colors 40 to 44 are as described below, for example. The color 40 is dark red, which is specified by #cc0000. The color 41 and the color 44 are salmon, which is specified by #ff9966. The color 42 is beige, which is specified by #ffcccc. The color 43 is dark khaki, which is specified by #cc6666.

The above #xxxxxx such as #cc0000 is a code for a color, representing an RGB value specified in an HTML tag or a style sheet.

In this manner, the themes "gorgeous" and "Art Nouveau" are selected as the effect (tone) of the entire document file. Thereby, the style adjuster 12 adjusts the style color tone of the document file 47 as stated above and adjusts the font of the text characters in the document file 47 so as to be suggestive of Art Nouveau. Furthermore, the vector image adjuster 13 adjusts the vector image 45 so that it becomes suggestive of Art Nouveau (a delicate and noble image). In addition, the raster image adjuster 14 adjusts the color tone of the raster image 43 to dark khaki.

Figure 5:
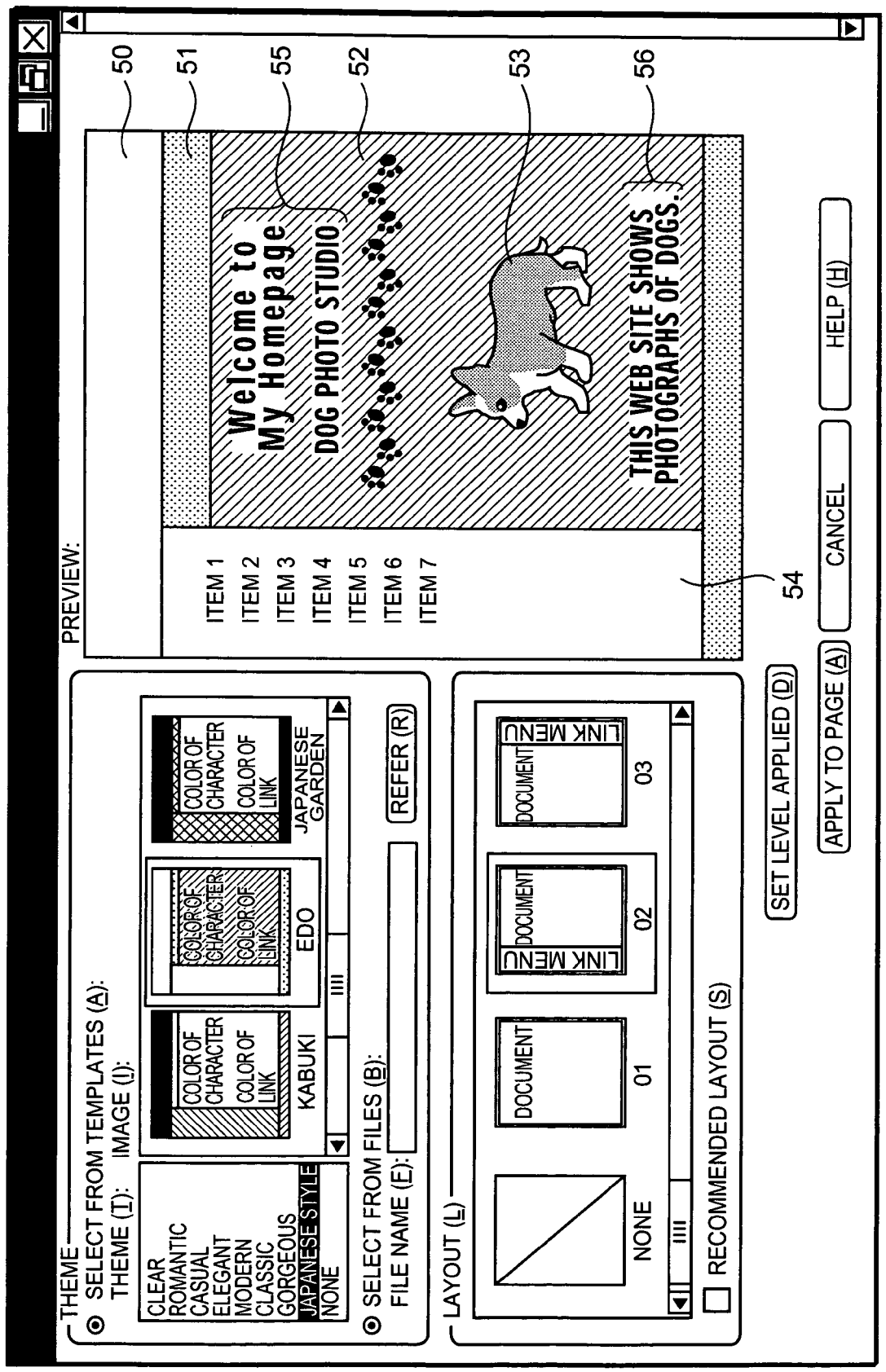
FIG. 5 is a diagram showing a screen displayed by the display device for making a tone adjustment by selecting a theme according to the embodiment of the present invention.

Referring to FIG. 5, there is shown a tone adjustment of the theme "Japanese style" for comparison with the theme "Art Nouveau" shown in FIG. 4. In this example, the detailed themes are "Kabuki" producing an effect (tone) Japanese and suggestive of the Kabuki, "Edo" producing an effect (tone) Japanese and suggestive of Edo, and "Japanese garden" producing an effect (tone) Japanese and suggestive of a Japanese garden.

In FIG. 5, colors 50 to 54 are as described below, for example. The color 50 is teal blue, which is specified by #006699. The color 51 is bright green, which is specified by #bed742. The color 52 is khaki, which is specified by #cccc33. The color 53 is chocolate, which is specified by #cc6633. The color 54 is navy, which is specified by #000080.

In FIG. 5, for generating the effect (tone) of "Japanese" and "Edo," the color tone is based on navy and characters in the vector image 55 and the text characters are Edo-style.

In this manner, the themes "Japanese" and "Edo" are selected as the general effect (tone) of the entire document file. Thereby, the style adjuster 12 adjusts the style color tone of the document file 47 as stated above and adjusts the font of the text characters in the document file 47 so that it becomes suggestive of Edo. Furthermore, the vector image adjuster 13 adjusts the vector image 45 so that it becomes suggestive of Edo (an Edo-style font image as is used for the Kabuki). In addition, the raster image adjuster 14 adjusts the color tone of the raster image 43 to the chocolate color.

While the general effect (tone) of the document file can be adjusted by selecting themes as stated above, it is also possible to adjust the tone without selecting themes. In addition, after the tone adjustment with the selection of themes as stated above, it may be possible to make numerical tone adjustments (fine adjustments) as described below.

Figure 6:
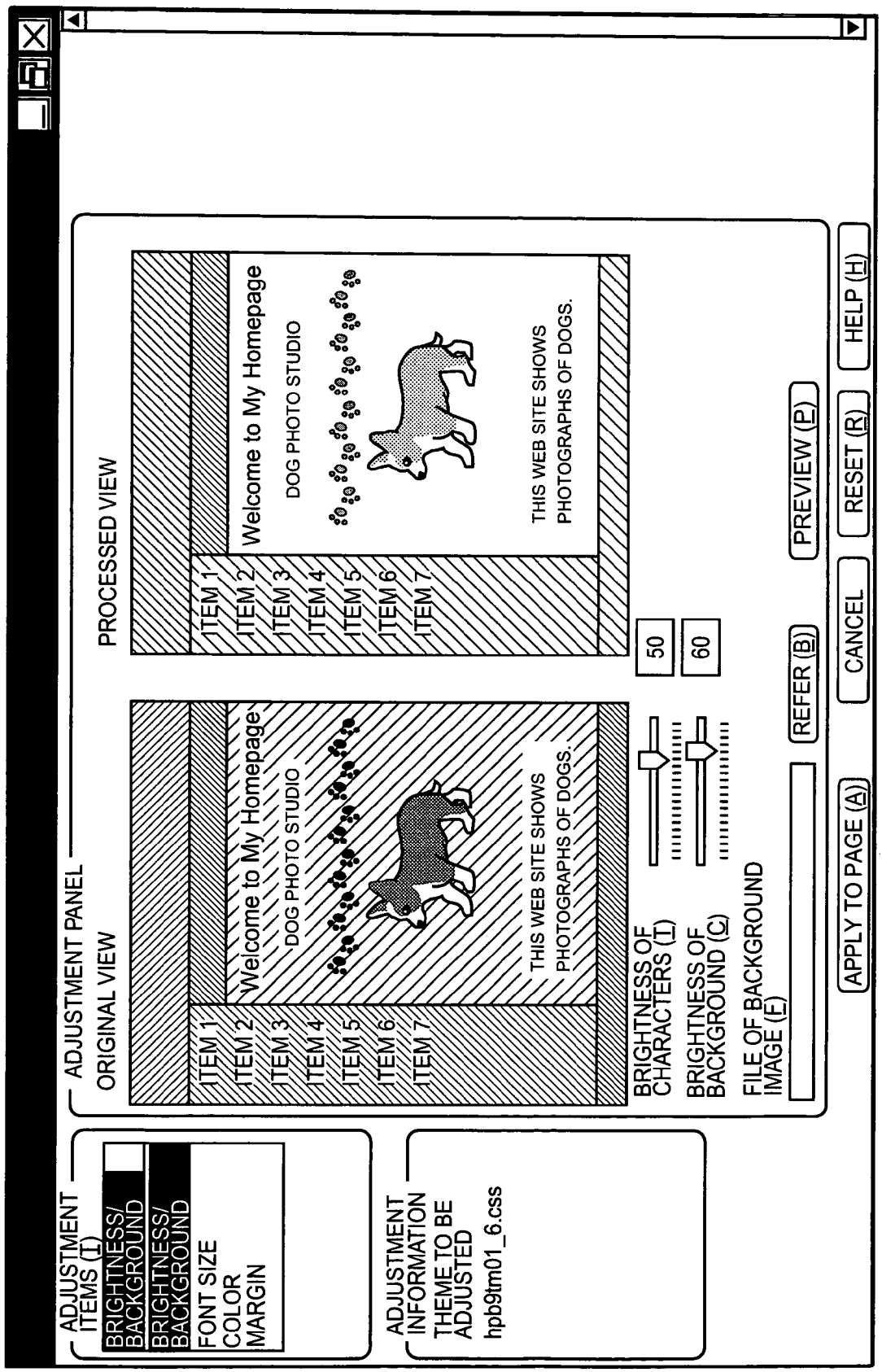
FIG. 6 is a diagram showing a screen displayed by the display device for making a tone adjustment of brightness according to the embodiment of the present invention.

Referring to FIG. 6, there is shown a tone adjustment by adjusting the "brightness" of the entire document file. The adjustment item is "brightness." The brightness of the characters used in the document file and the brightness of the background of the document file are adjusted by adjusting the settings on the adjustment panel, "brightness of characters" and "brightness of background," respectively. In this example, the brightness of the characters is increased by 50% by changing the setting from 0 to 50 and the brightness of the background of the document file is increased by 60% by changing the setting from 0 to 60.

The "brightness" of the general effect (tone) of the entire document file is thus adjusted as shown in FIG. 6. The style adjuster 12 adjusts the brightness of the background of the document file as stated above and adjusts the brightness of the text characters in the document file. Furthermore, the vector image adjuster 13 adjusts the brightness of the special effect characters of the vector image 45.

Figure 7:
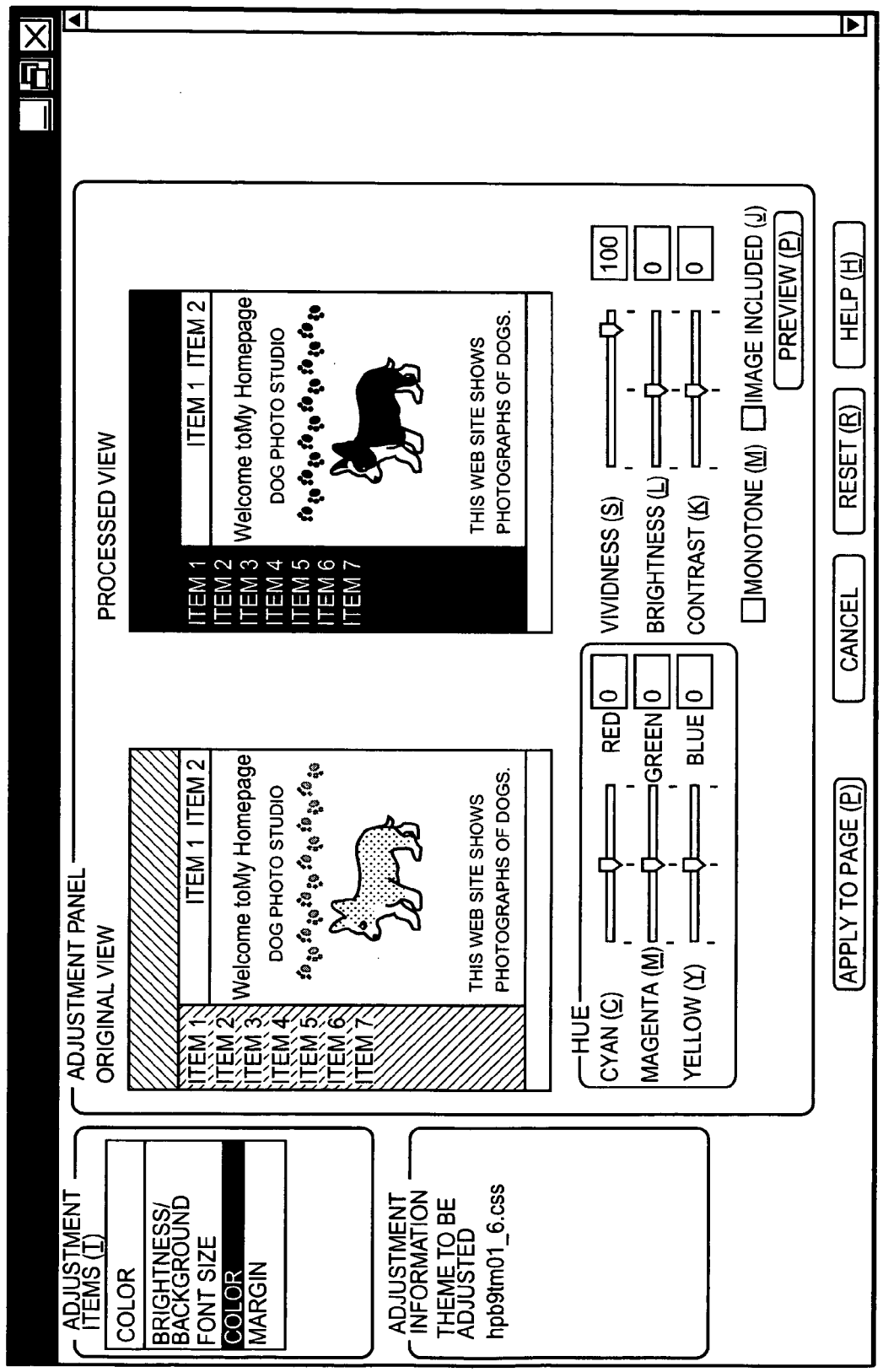
FIG. 7 is a diagram showing a screen displayed by the display device for making a tone adjustment of color according to the embodiment of the present invention.

Referring to FIG. 7, there is shown a tone adjustment by adjusting the "color tone" of the entire document file. The adjustment item is "Color." The color of the entire document file is adjusted by adjusting the settings on the adjustment panel, "hue," "vividness" and "contrast." In this example, the entire document file is made more vivid (sharp in contrast of colors) by changing the setting "vividness" from 0 to 100.

The "color tone" of the general effect (tone) of the entire document file is thus adjusted as shown in FIG. 7. The style adjuster 12 adjusts the color tone of the document file as stated above. Furthermore, the vector image adjuster 13 adjusts the color tone of the vector image 45 so that it becomes more vivid. In addition, the raster image adjuster 14 adjusts the color tone of the raster image 43 so that it becomes more vivid.

While the color tone has been adjusted so as to be more vivid in the above description, the entire document file can be made red-tinged or blue-tinged by a hue adjustment. In this case, the style adjuster 12, the vector image adjuster 13 and the raster image adjuster 14 adjust the color tone in the same manner as for the above.

Figure 8:
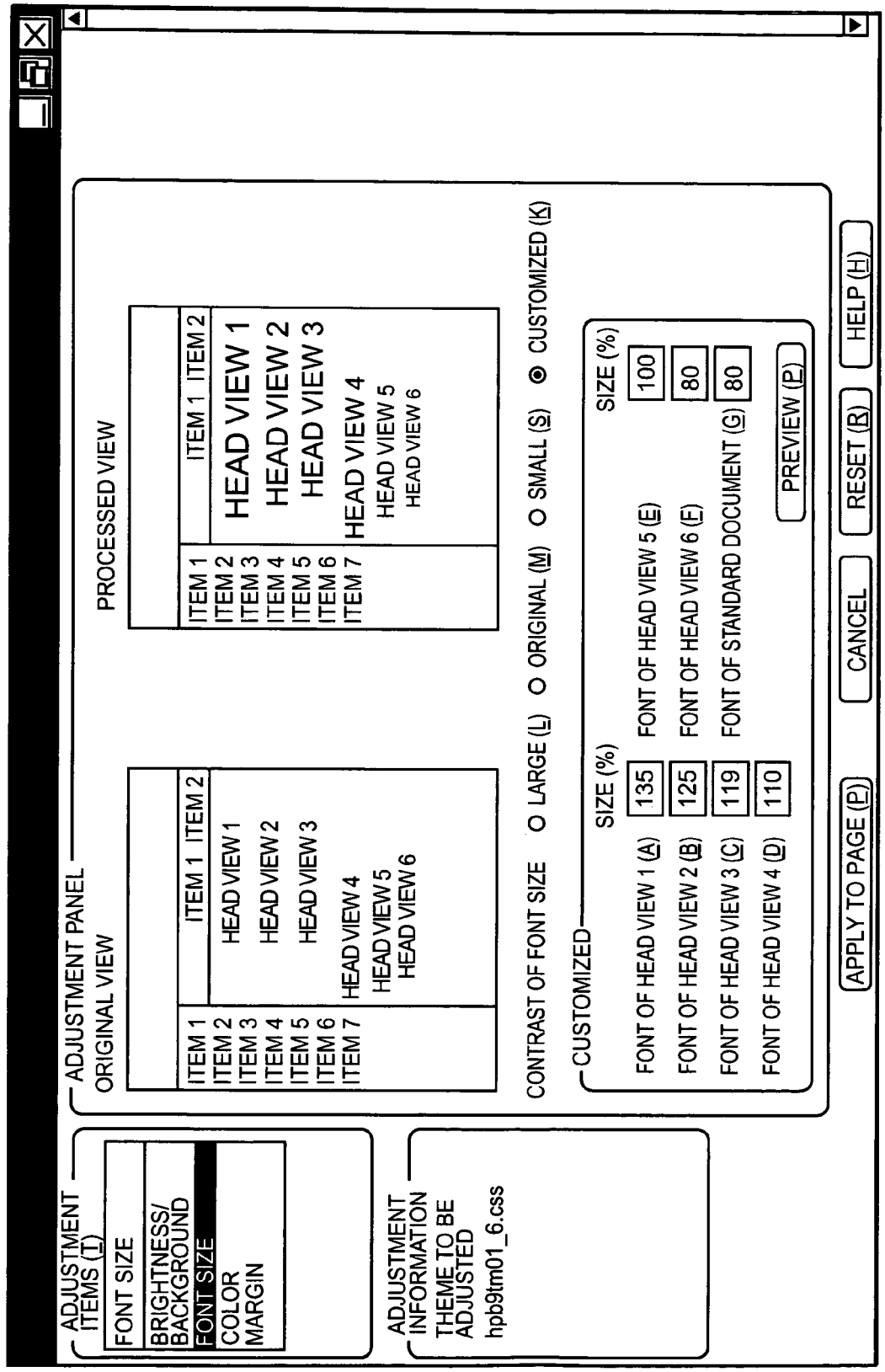
FIG. 8 is a diagram showing a screen displayed by the display device for making a tone adjustment of font size according to the embodiment of the present invention.

Referring to FIG. 8, there is shown a tone adjustment by adjusting the font size of the entire document file. The adjustment item is "font size." The contrast in size of head line characters can be adjusted by adjusting the setting on the adjustment panel, "contrast in font size." The head line characters means characters that form a class of a title, a subtitle, or a subtitle under the subtitle in the document file.

As shown in FIG. 8, the font size of the entire document file can be changed. The character size can be adjusted by selecting one of the items in "contrast of font size" that are "large," "small," "original" and "customized." Particularly by the selection of "customized", it is possible to adjust the size of the font of headline 1 to headline 6 and the size of the standard text characters in terms of a ratio to the original size.

The adjustment of "Font size" in the general effect (tone) of the entire document file is thus adjusted. The style adjuster 12 adjusts the font size of the document file as stated above.

Figure 9:
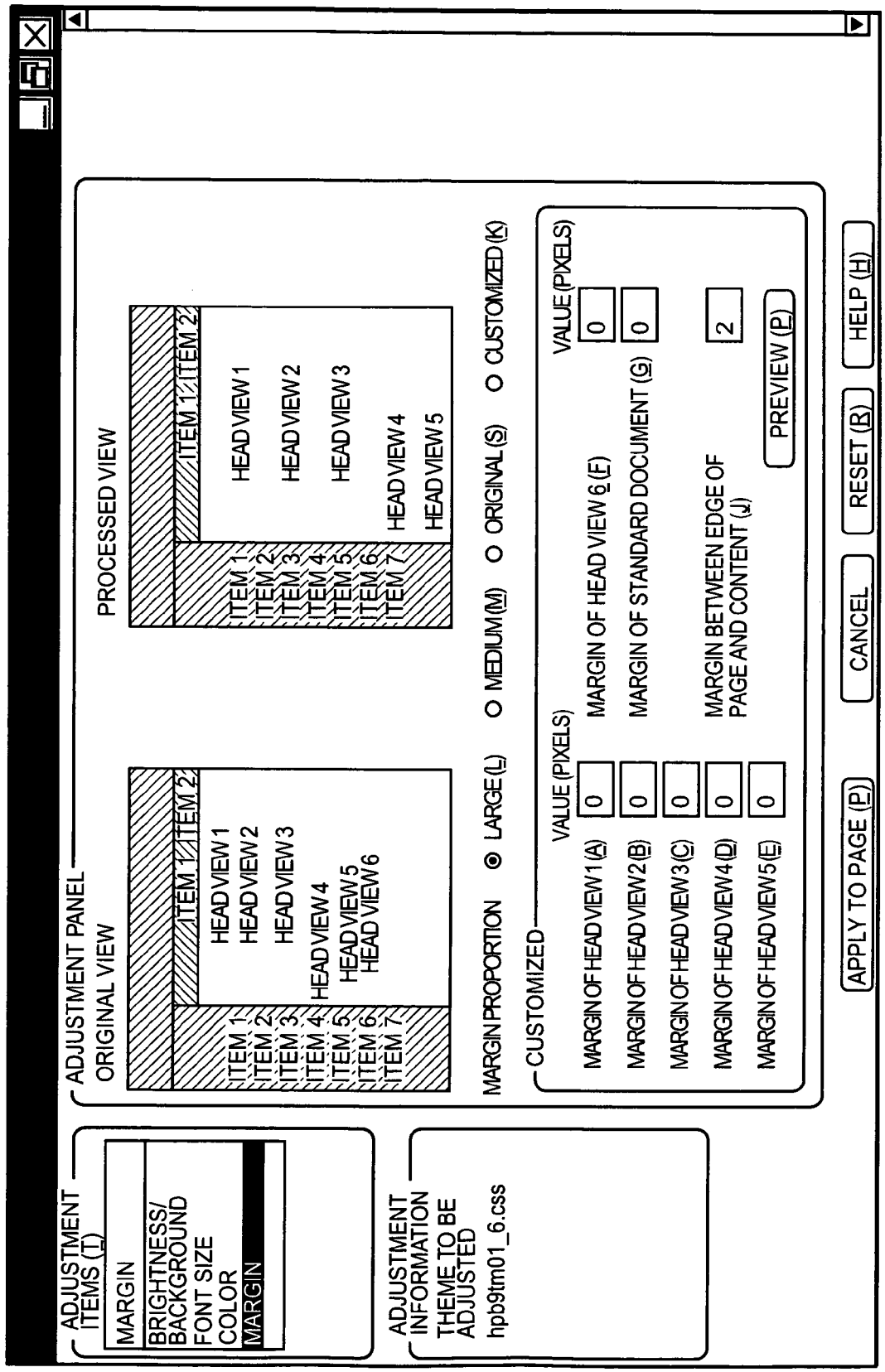
FIG. 9 is a diagram showing a screen displayed by the display device for making a tone adjustment of margin according to the embodiment of the present invention.

Referring to FIG. 9, there is shown a tone adjustment by adjusting a margin of a headline of the entire document file. The adjustment item is "margin." The margin of each headline can be adjusted by adjusting the setting on the adjustment panel "margin proportion" by selecting one of "large," "medium," "original" and "customized." Particularly by the selection of "customized", it is possible to adjust the margin of headline 1 to header 6, the margin of the standard text characters, and the margin between the edge of the page and the content in terms of pixel values.

The "margin" of the document file is thus adjusted as shown in FIG. 9. The style adjuster 12 adjusts the margins of the document file as stated above.

Figure 10:
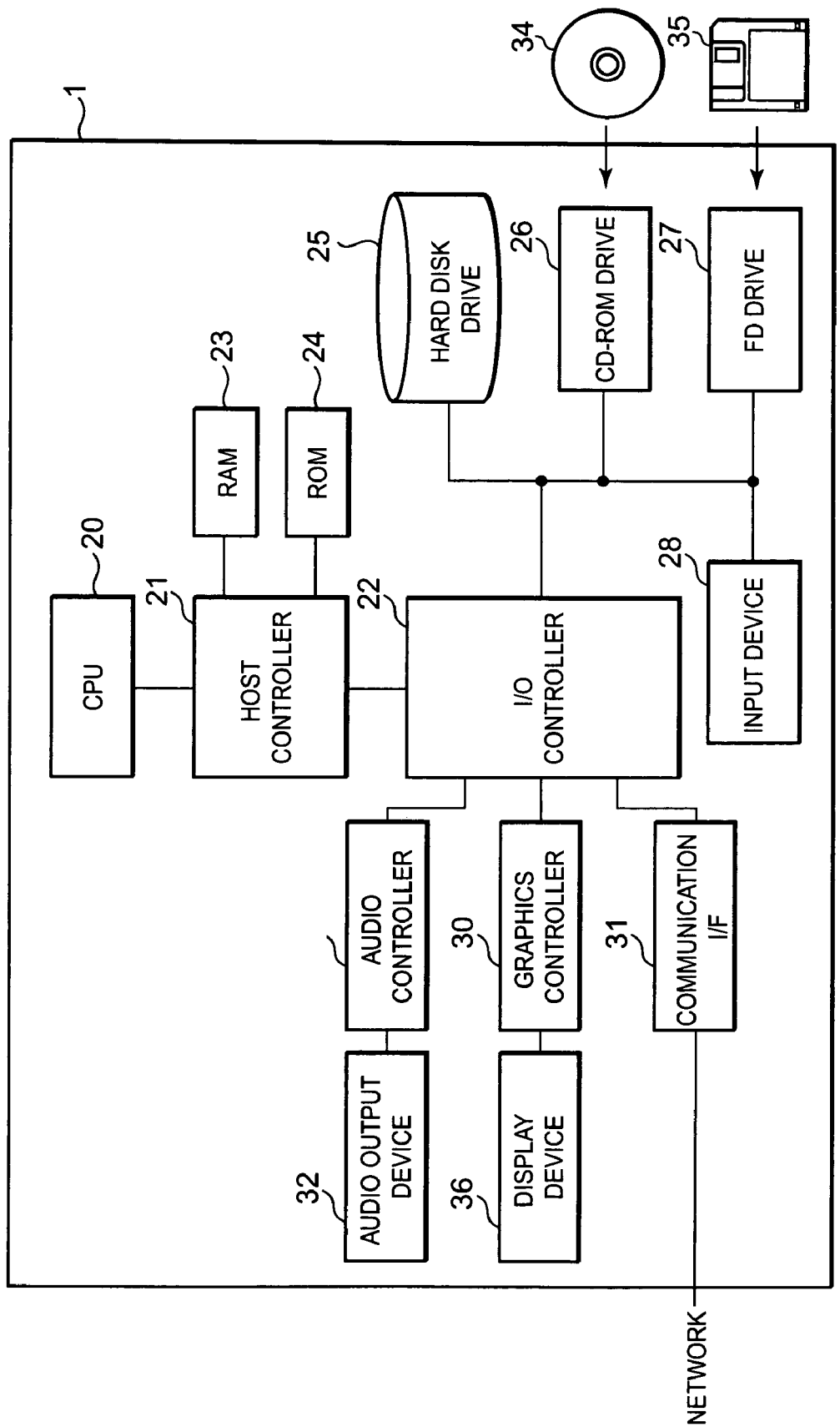
FIG. 10 is a diagram showing a hardware configuration of a computer system.

The computer system 1 may, for example, include a central processing unit (CPU) 20, a host controller 21, an I/O controller 22, a random access memory (RAM) 23, a read only memory (ROM) 24, a hard disk drive 25, a DVD/CD-ROM drive 26, a Floppy™ disk (FD) drive 27, an input device 28 that is a mouse, a keyboard or the like for receiving an input from a user, an audio controller 29, an audio output device 32, a graphics controller 30 and a display device 36, as shown in FIG. 10.

Figure 11:
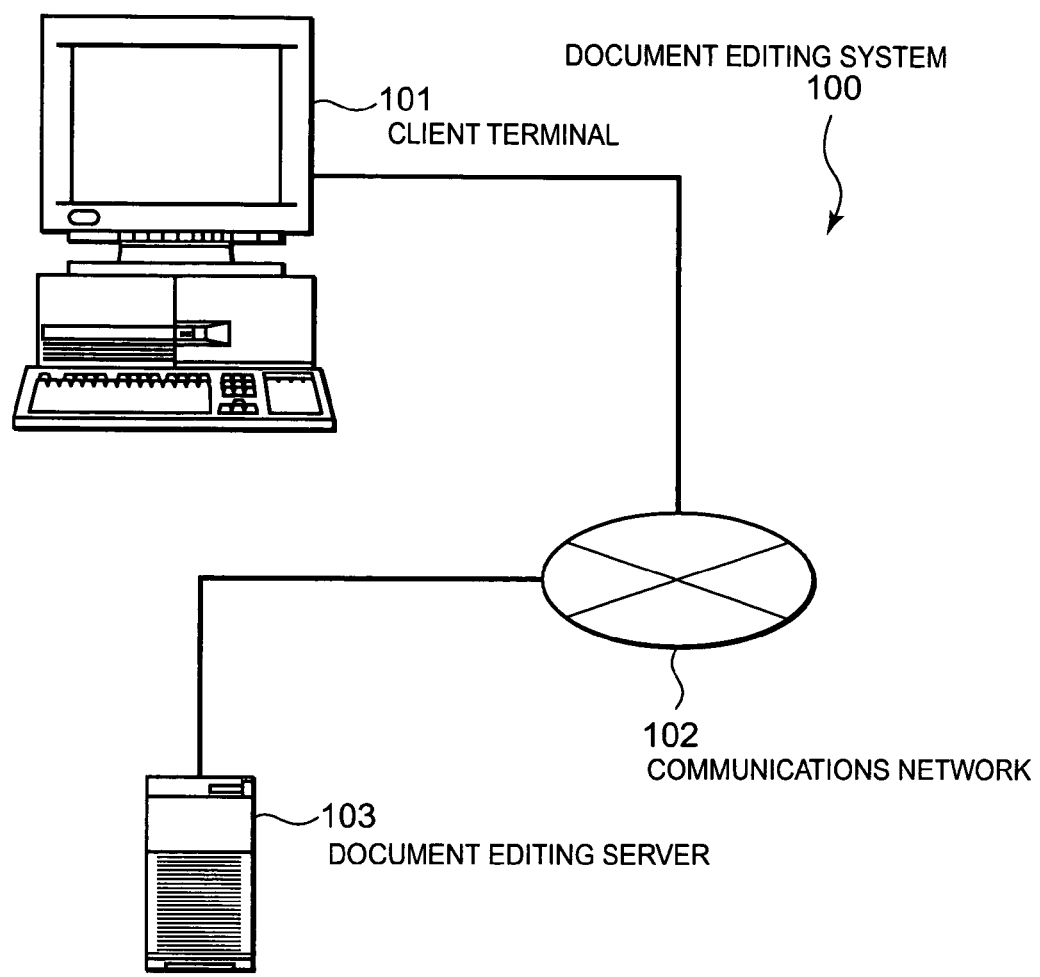
FIG. 11 is a diagram showing a configuration of a document editing system.

As another embodiment of the present invention, the document editing system 100 may comprise and be embodied by a client terminal 101, a server 103 and a communications network 102 for connecting these as shown in FIG. 11.

Specifically, the client terminal 101 may be the aforementioned computer system 1 and be provided with the tone input device 11 and the display device 15. The document editing server 103 may also be the computer system 1 and be provided with the parameter converter 10, the style adjuster 12, the vector image adjuster 13 and the raster image adjuster 14. For example, the document editing system 100 may receive an input of a tone adjustment from the client terminal 101 and transmit the input tone information to the document editing server 103 via the communications network 102. The document editing server 103 may adjust the document file, transmit the result to the client terminal 101 via the communications network 102. The display device 15 of the client terminal 101 may display the adjusted document file.

The computer system and the document editing method according to these embodiments can be implemented via a program executed using a computer or a server. A storage medium for this program is an optical storage medium, a tape medium, a semiconductor memory or the like. It is also possible to provide the program via a network by using a hard disk, a RAM, or other storage device disposed in a server system connected to a dedicated communications network or the Internet as the storage medium.

While the preferred embodiments of the present invention have been described hereinabove, it is to be understood that these embodiments are for an illustrative purpose only as concrete examples and the subject encompassed by the present invention is not limited to those specific embodiments. Moreover, the effects described in the embodiments of the present invention are only the most preferable effects of the present invention and the effects of the present invention are not limited to those described in these embodiments of the present invention.

What is claimed is:

1. A document editing method for adjusting a general property of a document file in a website through use of a computer, the document file including a raster image and a vector image, the method comprising the steps of:
    adjusting a tone according to a theme selected from a plurality of themes by a user;
    generating parameters representing a tone of the document file;
    adjusting a style tone of the parameterized document file according to the selected theme;
    adjusting a vector tone of the parameterized document file according to the selected theme;
    adjusting a raster tone of the parameterized document file according to the selected theme;
    displaying the document file adjusted according to the selected theme;
    parameterizing the style tone, the vector tone and the raster tone, respectively, when the phased tone adjustment inputs relating to fine adjustment of tone are received from the user;
    adjusting the parameterized style tone and adjusting the style of the document file when the tone adjustment inputs indicate the adjustment of style tone;
    adjusting the parameterized vector tone and adjusting the vector image included in the document file when the tone adjustment inputs indicate the adjustment of vector tone;
    adjusting the parameterized raster tone and adjusting the raster image included in the document file when the tone adjustment inputs indicate the adjustment of raster tone; and
    displaying the document file that includes the adjusted vector image and adjusted raster image, and that has been changed according to the adjusted style tone,
    wherein the step of adjusting the vector image contained in the document file includes the further step of adjusting special effect characters stored as the vector image as a function of the tone from the user.

2. The document editing method according to claim 1, wherein
    the steps of adjusting the tone, generating parameters, adjusting the style tone, adjusting the vector tone, adjusting the raster tone, and parameterizing the style tone, the vector tone, and the raster tone are all executed on the computer.

3. The document editing method according to claim 1, wherein
    the style of the document file is the setting of layout, tone, font, and margins of the document file.

4. The document editing method according to claim 1, wherein
    the style adjustment of the document file is made by adjusting a cascading style sheet (CSS).

5. The document editing method according to claim 1, wherein
    the step of adjusting the raster image contained in the document file includes the further step of adjusting tone in response to the tone adjustment input from the user.

* * * * *